G. A. GARCIA.
TOKEN CONTROLLED VENDING MACHINE.
APPLICATION FILED AUG. 24, 1916.

1,229,741.

Patented June 12, 1917.
6 SHEETS—SHEET 1.

INVENTOR
Gonzalo Arriva Garcia
BY
Edwin S. Beach
ATTORNEY

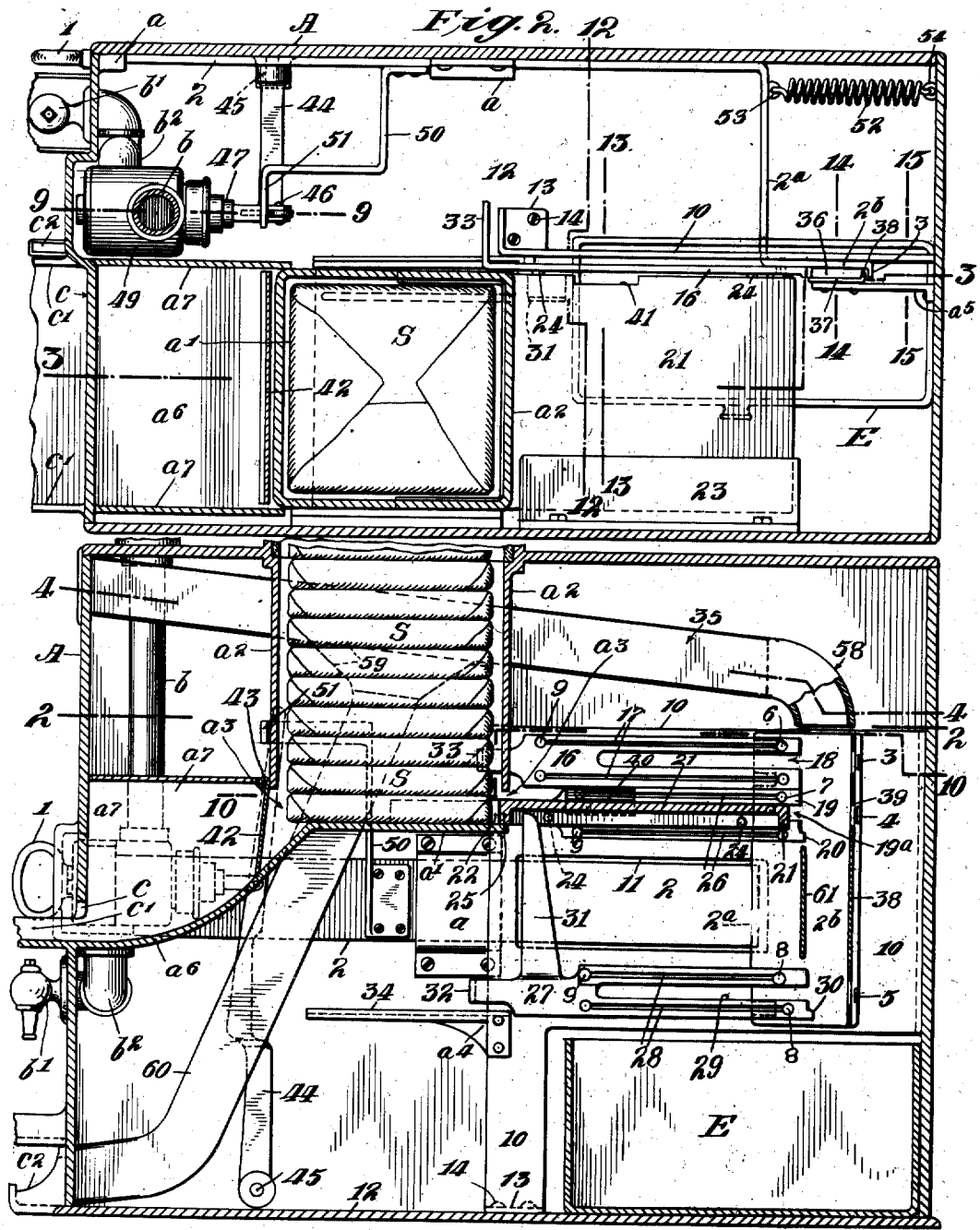

G. A. GARCIA.
TOKEN CONTROLLED VENDING MACHINE.
APPLICATION FILED AUG. 24, 1916.
1,229,741.
Patented June 12, 1917.
6 SHEETS—SHEET 3.
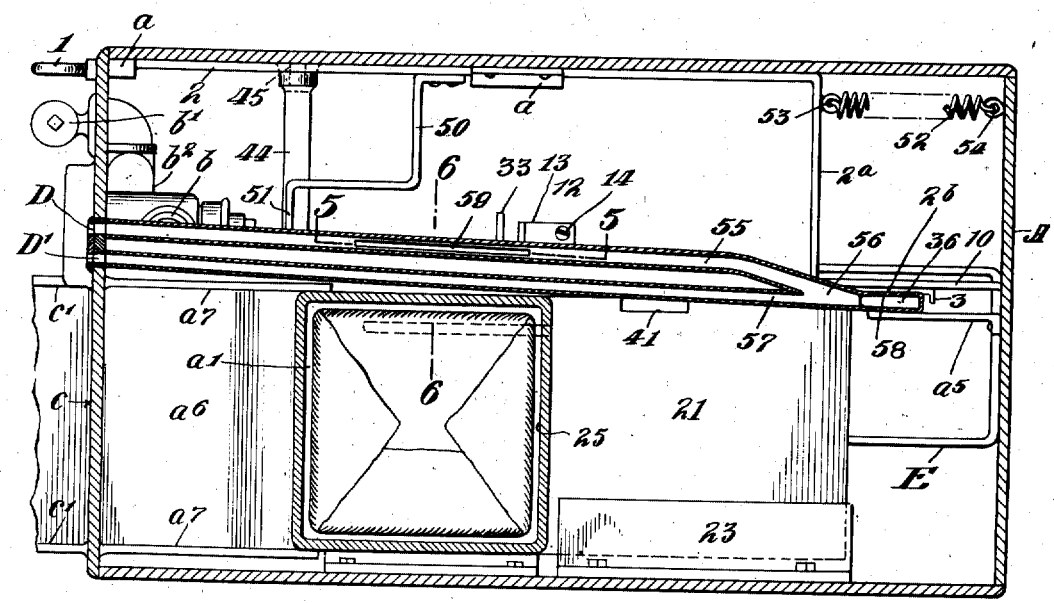
Fig. 4.
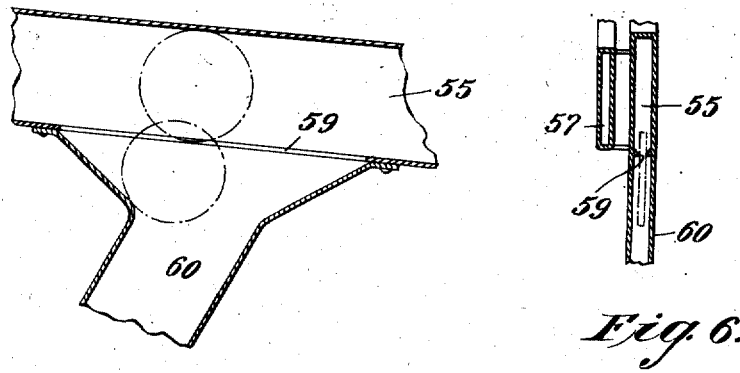
Fig. 5.
Fig. 6.
INVENTOR
Gonzalo Ausina Garcia
BY Edward J. Beach
ATTORNEY

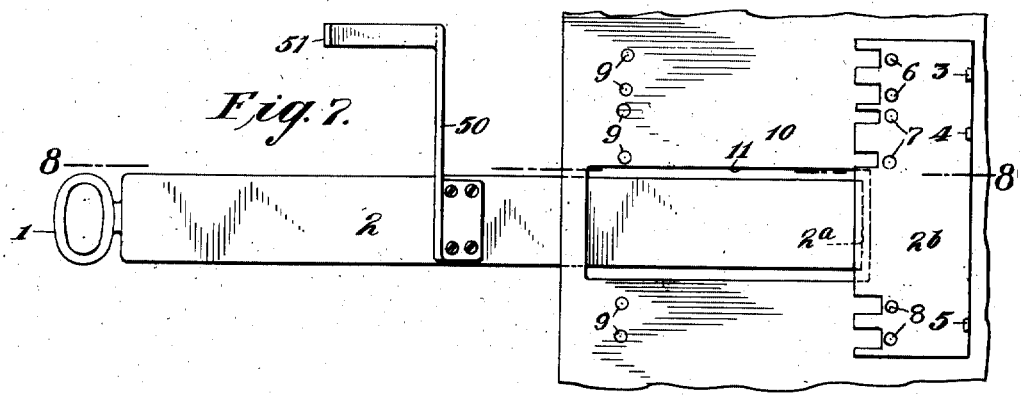
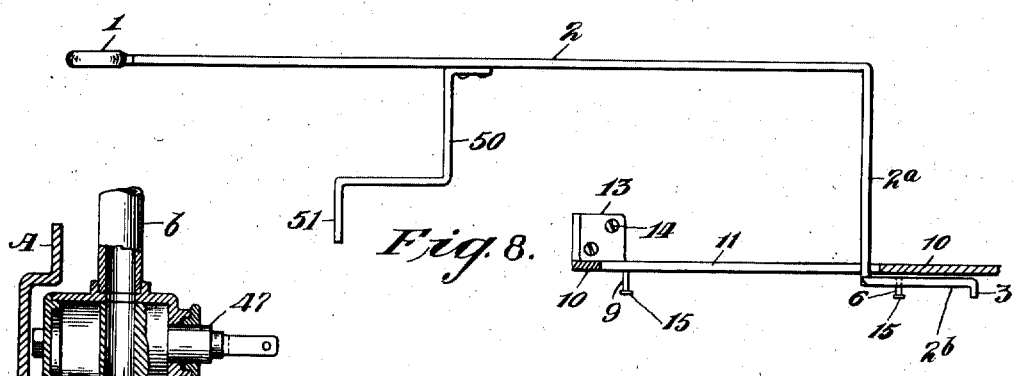
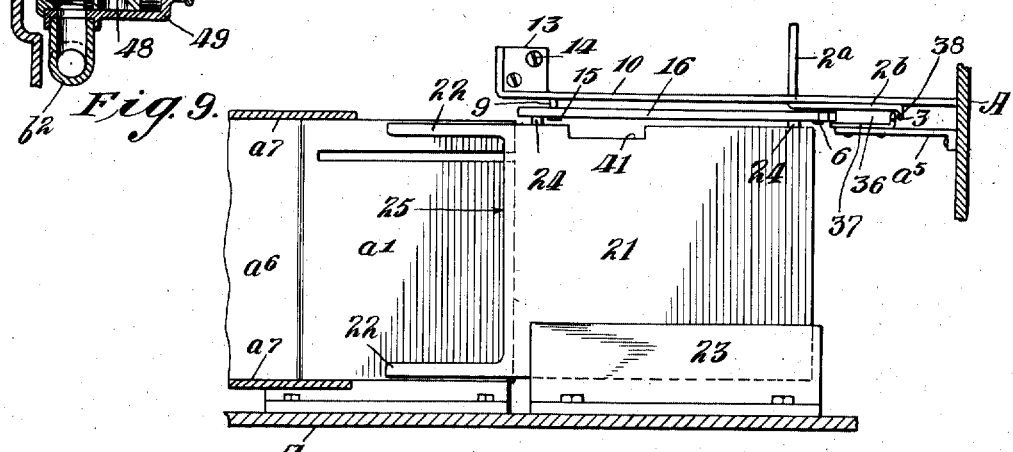

G. A. GARCIA.
TOKEN CONTROLLED VENDING MACHINE.
APPLICATION FILED AUG. 24, 1916.

1,229,741.

Patented June 12, 1917.
6 SHEETS—SHEET 5.

INVENTOR
Gregorio Arcina Garcia

ATTORNEY

G. A. GARCIA.
TOKEN CONTROLLED VENDING MACHINE.
APPLICATION FILED AUG. 24, 1916.

1,229,741.

Patented June 12, 1917.
6 SHEETS—SHEET 6.

INVENTOR
Gonzalo Avelino Garcia
BY
ATTORNEY

UNITED STATES PATENT OFFICE.

GONZALO ANCIRA GARCIA, OF GUADALAJARA, MEXICO.

TOKEN-CONTROLLED VENDING-MACHINE.

1,229,741.      Specification of Letters Patent.      Patented June 12, 1917.

Application filed August 24, 1916. Serial No. 116,593.

*To all whom it may concern:*

Be it known that I, GONZALO ANCIRA GARCIA, a citizen of Mexico, residing at Guadalajara, State of Jalisco, Mexico, have invented certain new and useful Improvements in Token-Controlled Vending-Machines, of which the following is a specification.

This invention relates to token-controlled vending machines. The object of the invention is to produce a simple and efficient structure of compact form. The embodiment of my invention herein illustrated is in a form particularly adapted for the vending of a beverage and also of a sandwich or the like; or of a sandwich or the like without delivering the beverage. Thus, for example, if the machine is installed in a railway car, the user may obtain from the machine sandwiches and grapejuice, or sandwiches alone, obtaining his beverage from the free water supply of the car. Hereinafter I use the terms solid or solids to indicate solid merchandise, in contradistinction to the liquid vended. I use the word token herein to include coins and also any other kinds of deposited pieces which it may be desired to avail of. Such tokens serve temporarily as loose mechanical connections in the operation of the machine, as usual in this class of machines.

In the accompanying drawings,

Fig. 2 is a view partially in plan and partially in horizontal section, at line 2—2 of Fig. 3, looking down.

Fig. 3 is a view partially in elevation and partially in vertical section at line 3—3 of Fig. 2.

Fig. 4 is a view partially in plan and partially in section at line 4—4 of Fig. 3. This view particularly illustrates the construction and arrangement of a three-way branch token-chute, one branch of the chute being for tokens of one and the other branch of it for tokens of another diameter that are to be retained, and the third branch for escape and return to the purchaser of tokens inserted but not accepted by the machine.

Fig. 5 is a vertical sectional detail of the junction of the escape chute with one branch of the chute for acceptable tokens. This view is taken at line 5—5 of Fig. 4.

Fig. 6 is a transverse view of the branched token-chute at line 6—6 of Fig. 4.

Fig. 7 is a side elevational view of the token-engaging cross-head and re-setting arm, and of a portion of a frame plate carrying pins for partially supporting token-engaging push-bars, not shown.

Fig. 8 is a plan view of what is shown in Fig. 7, looking down, and partially in section at line 8—8 of Fig. 7.

Fig. 9 is a vertical central sectional view at line 9—9 of Fig. 2, of the liquid-measuring apparatus.

Fig. 10 is a plan view, partially in section at a line corresponding to 10—10 of Fig. 3, and shows a forked horizontally reciprocable feeder in coöperative relation to the bottom of a container for a stack of solids, the lowermost member of which stack is to be successively removed. This view also shows a portion of the delivery chute for the solid ejected by the feeder and also details.

Figure 1:
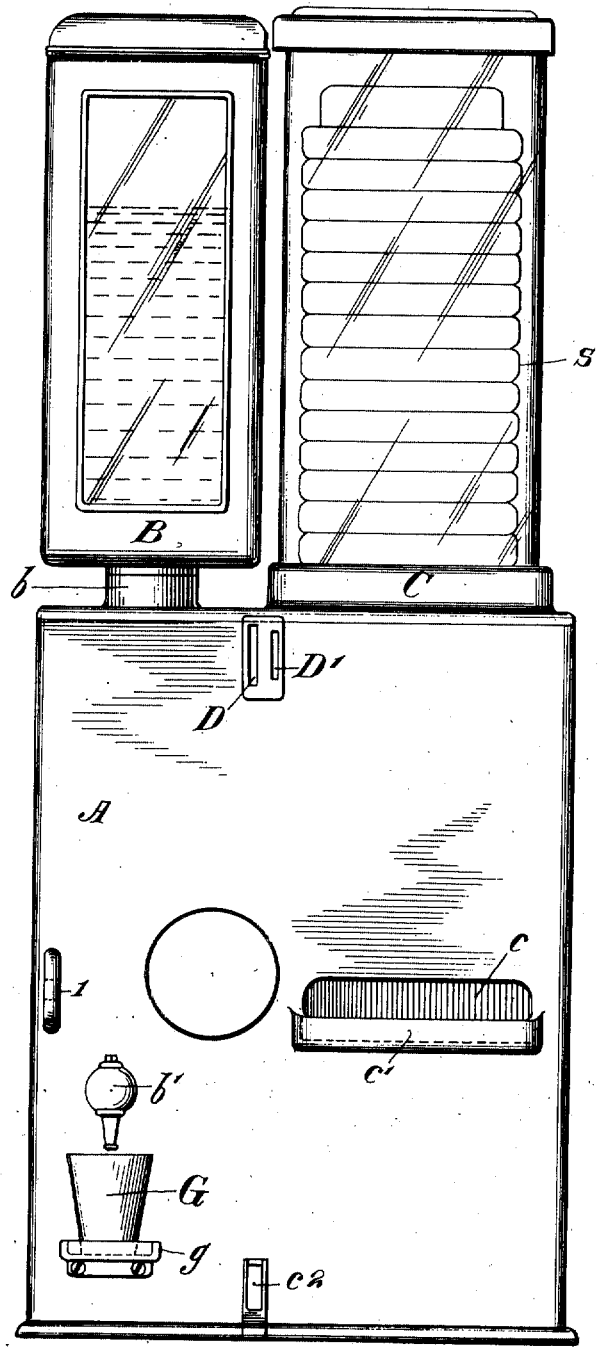
Figure 1 is a front elevation of said form of my new machine.
Figure 11:
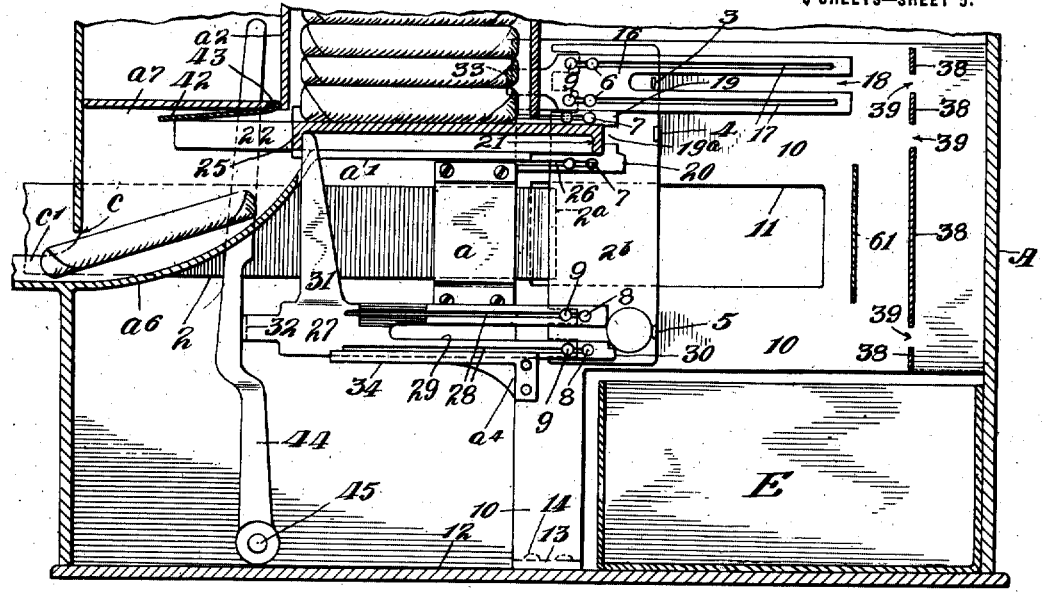

Fig. 11 is a view partially in section at a line coresponding to line 3—3 of Fig. 2, and shows in elevation the feeding mechanism in its forward position with the lowermost solid of the stack in the delivery chute for the solids.

Figure 12:
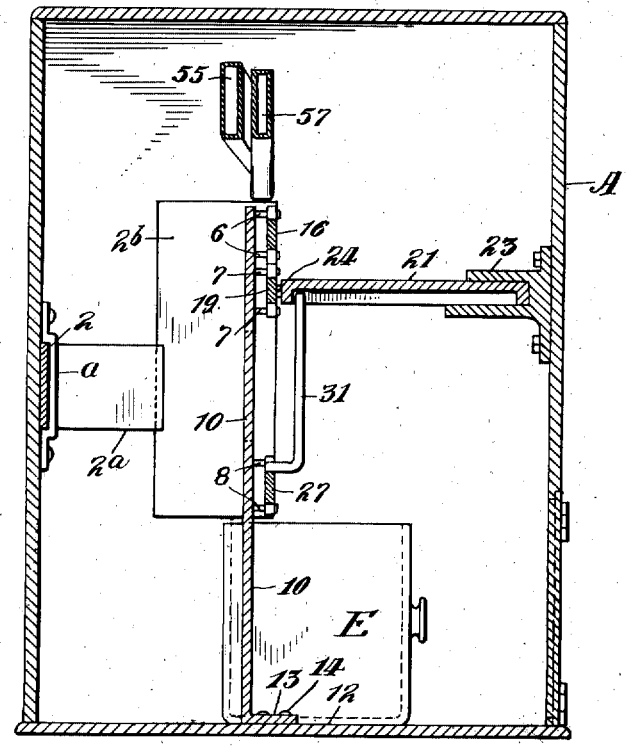

Fig. 12 is a vertical sectional view at line 12—12 of Fig. 2, and shows two branches of the token-chute, and also shows the feeder, the actuator, and other details.

Figure 13:
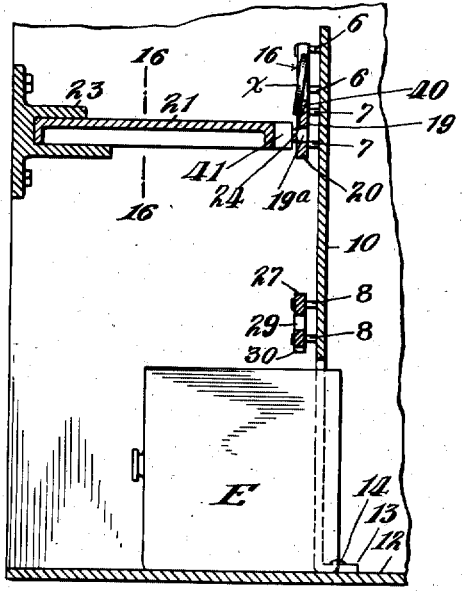

Fig. 13 is a vertical sectional view at line 13—13 of Fig. 2 and illustrates the mode of construction and of operation of the laterally-beveled token-escape with which the feeder-carrying push-bar is provided in order that the token retained may be freed for dropping in the coin-box.

Figure 14:
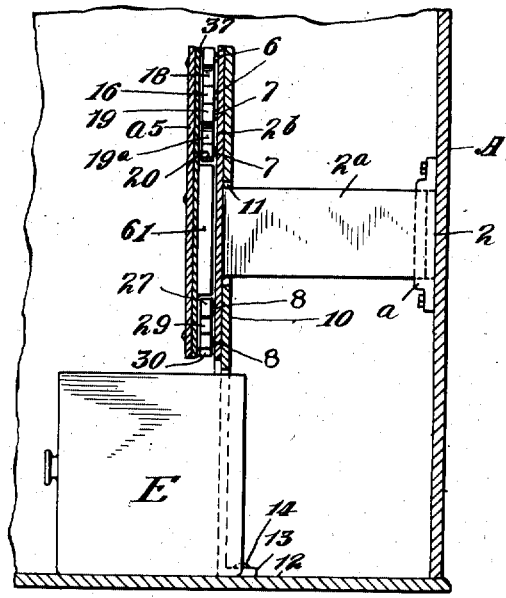

Fig. 14 is a vertical sectional view at line 14—14 of Fig. 2, and particularly illustrates the arrangement of parts that constitute a vertical token-way in which tokens are gripped between lugs on the cross-head of the actuator mechanism and opposed rear ends of the push-bars prior to their being carried forward into the escape position shown in Figs. 11 and 13 at about which time either a drink with a solid are served, or a solid is served without a drink, according to the amount paid into and accepted by the machine.

Figure 15:
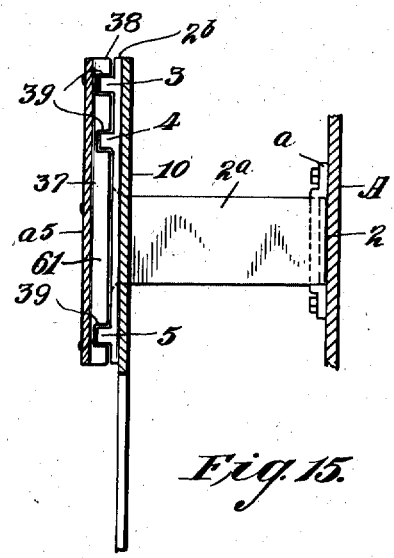

Fig. 15 is a view partially in vertical section at line 15—15 of Fig. 2, and shows particularly a rear elevation of the token-engaging lugs on the actuator cross-head coöperating with the slotted web of an upstanding plate in forming the rear side wall of said vertical token-way in which the tokens are gripped and out of which they are carried for release, on release of the handle of the actuator mechanism.

Figure 16:
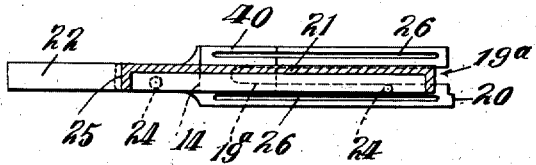

Fig. 16 is a view partially in lengthwise section through the feeder, but particularly showing the lengthwise lug-receiving slot of the feeder-carrying push-bar, such slot not being plainly shown in other figures.

In the drawings, A indicates the casing of the machine and B a liquid-container having a supply pipe $b$ in connection with the liquid delivery device $b'$. C represents a container for solids herein shown as sandwiches marked S and severally wrapped. $c$ indicates the solid-delivery opening in the front of the casing, $c'$ a tray at the front of the casing for reception of the delivered solids, and $c^2$ a front opening for escape of tokens which the machine will not accept.

In explanation of this feature, I note that the machine is intended to receive and accept United States dimes and nickels, and to return United States pennies or one-cent pieces if they are deposited by the purchaser.

G represents a drinking cup on a bracket $g$ at the front of the casing. D and D' represent token-receiving slots in the front wall of the casing. In the present form of machine, slot D is made of the right dimensions for receiving a nickel or five-cent piece edgewise. It will therefore receive a one-cent or penny coin of the present coinage. Slot D' is of the right dimensions for receiving a dime edgewise. It will therefore not receive either a nickel or a penny.

The operating mechanisms are as follows. 1 is the accessible handle end of the forward portion 2 of a pull-bar which is a member of the actuator mechanism and is mounted in brackets $a$ on the inner face of a side wall of casing A, this pull-bar projecting through the casing at the front thereof. Rearwardly, pull-bar 2 has a right-angular laterally-bent portion $2^a$, the rear end of which has a right-angular bent portion $2^b$ parallel with pull-bar 2 and shaped to form a vertically standing cross-head.

Cross-head $2^b$ (Fig. 7) carries a series of vertically arranged token-engaging lugs 3, 4 and 5, projecting laterally from the inward side of the cross-head which is provided near its front edge and on its side from which the lugs project, with a series of pins 6, 6, 7, 7 and 8, 8 for the token-engaged horizontally-reciprocable push-bars described below. The purpose of these pins 6, 7 and 8 is to engage with such push-bars on their rearward or return movements.

Such push-bars are partially supported by the pins 6, 7 and 8, and also partially supported by the pins 9 a vertical series of which project from the vertical stationary frame plate 10 in the same directions as the pins 6, 7 and 8. Pins 6, 7 and 8, when the cross-head is restored to initial position, engage the rear ends of slots 17, 26 and 28 respectively, and pull the push-bars back the proper distances from the initially positioned lugs 3, 4 and 5, and into their initial position.

The laterally bent portion $2^a$ of the pull-bar passes through a horizontally elongated slot 11 in the frame plate 10 which is vertically arranged within the casing and secured to the bottom 12 thereof by its foot 13 and screws 14. Cross-head $2^b$ is a reciprocable actuator head moved forwardly by a forward pull on the pull-bar, and rearwardly by the spring.

The pins 6, 7, 8 and 9 are all formed with reduced shanks and flanged heads 15 (Fig. 8) and in the form of machine shown there are three edgewise horizontally-extending reciprocable token-actuated push-bars, one closely above the other (Figs. 3 and 11). This is a compact and therefore durable construction.

The topmost push-bar 16 is formed with two parallel lengthwise-extending slots 17, one above the other, and which receive the pins 6, 6 on the actuator head $2^b$, also receiving the pins 9, 9 on the vertical stationary frame plate 10. This topmost push-bar 16 has a lengthwise-extending slot 18 which is open at the rear end of the push-bar and extends forwardly for a portion of the length thereof. The purpose of this slot is to receive the token-engaging lug 3 when the actuator is pulled forwardly for engagement of a nickel or token between lug 3 and the opposed end of push-bar 16.

The intermediate or feeder-carrying token-actuated push-bar 19 is provided at its lower rear corner with a token-supporting abutment 20, and carries a laterally-projecting shelf-like horizontal feeder 21, the forward end of which has corner fork arms 22 (Fig. 10). The front end of the feeder operates to push the lowermost sandwich S from the bottom of the stack in container C. One edge of the feeder is supported by a horizontally slotted bracket 23 fixed to an inner side wall of the casing, an edge of the feeder being slidably mounted in the bracket slot. The opposite edge of the feeder is pinned at 24, 24, in the form of construction shown, to the intermediate push-bar 19. The under surface of the forked front end of the feeder 21 works slidably on the upper surface of the horizontal bottom $a'$ of the solid-container C, the front and back sides $a^2$ of which extending downwardly from the upper portion of the casing, terminate above and out of contact with the bottom, leaving opposed spaces $a^3$ through the rearward one of which the feeder reciprocates and through the front one of which the lowermost solid of the stack is pushed outward for delivery. The forward under edge of the feeder 21, rearwardly of the fork-arms 22, is provided with a transverse abutment 25. This intermediate, feeder-carrying push-bar 19 is formed with parallel lengthwise extending slots 26 through which the pins 7, 7 on the actuator head and pins 9, 9 on the frame-plate 10 project, and it has a lengthwise extending slot 19$^a$ open at its rear end, as is the case with the upper and under push-bars. A token or nickel engaged between lug 4 and the rear end of the feeder-carrying push-bar 19 effects actuation of the feeder.

The bottom token-actuated push-bar 27 is provided with upper and under parallel lengthwise-extending slots 28 which receive the pins 8, 8 on the actuator head 2$^b$, and also pins 9, 9 on the stationary frame-plate 10. This push-bar 27 has a horizontal slot 29 open at its rear end and extending part way toward its front end for reception of the token-engaging projection 5 on the actuator head 2$^b$. The rear under corner of this push-bar 27 is provided with a token-supporting abutment 30, and near its front end has an upstanding laterally offset finger 31 which passes by a side of the intermediate push-bar 19 and extends into the bottom recess of the feeder 21 just rearwardly of the feeder's forward downwardly-extending transverse rib 25. The open lug-receiving slots 18, 19$^a$ and 29 are formed because if they were not present the token-engaging lugs could be impinged on the rear ends of the push-bars to operate the latter without the intervention of a token or tokens. This is an important feature of my new push-bar construction herein described.

This push-bar 27 has a forward right-angular horizontal extension 32 and the uppermost push-bar 16 has a forward right-angular horizontally-projecting extension 33. The projections 32 and 33 are in the path of a lever hereinafter referred to and which, although constituting in this particular form of my invention, the liquid-measuring lever, is more broadly considered as a work-performing or work-lever, and coöperate therewith during the liquid-delivering movement. The lower edge of the lowermost push-bar 27 in its forward position works in a lengthwise-extending groove 34 of a horizontal forwardly projecting bracket $a^4$ fixed to the front edge of the stationary upstanding frame plate 10, the bracket giving a firm under support to the push-bar 27 at such times (Figs. 3 and 11).

A three-way token-chute 35 adapted to receive coins edgewise, leads from the token-receiving slots D and D' rearwardly and downwardly toward the rear of the casing, and terminates above a vertical four-walled token-receiving space or token-way 36 (Fig. 2), which space is bounded on one broad side by the actuator head 2$^b$; on its opposite broad side by an upstanding stationary plate 37 parallel to the head 2$^b$ and supported by the bracket $a^5$ (Fig. 2); on its rear edge by a laterally projecting vertical web 38 of the plate 37, such web standing edgewise to head 2$^b$; and on its front edge in part by the rear ends of the coin-actuated push-bars 16, 19 and 27, and in part by a stationary fixed rib 61 which projects from the inward face of head 2$^b$ and is parallel with the web 38. The rearward web 38 of plate 37 has a series of notches 39 (Fig. 15) for passage therethrough of the token-engaging lugs 3, 4, and 5 on head 2$^b$, so that one or more tokens, as they drop from the token-chute downwardly into the upstanding token-way 36, may be engaged severally by a lug 3, or 4, or 5, each working against the edge of a token and pushing its opposite edge against the rear end of a token-actuated push-bar, the coin-supporting abutments 20 and 30 above referred to serving to arrest tokens of varying diameters as they gravitate downwardly through the token-way 36.

The feeder-carrying push-bar 19 is provided with a lateral bevel 40 by reason of which the token, as $x$ (Fig. 13), when it is moved to a forward position between lug 3 and the upper push-bar 16, is ultimately released, and on being released falls through a recess 41 in the underlying edge of the feeder into the token-box E mounted within the casing A underneath the series of superimposed coin-actuated push-bars. Any token engaged by lug 4 and push-bar 19 and any token engaged by the lug 5 and the bottom push-bar 27, also falls into the token-box E when released.

The forward portion $a^6$ of the bottom $a'$ of container C slopes downwardly and forwardly to the solid-receiver $c'$, the lowermost solid of the stack sliding out through the opening $c$ in the front wall of the casing. At the rear corner of a horizontal partition $a^7$ in the front portion of the casing, a gate 42 which is hinged at 43 is suspended and pushed forwardly by the advancing solid S when the lowermost one of the stack is pushed out. The purpose of this gate, the under free edge of which abuts against the forwardly and downwardly inclined forward portion $a^6$ of the bottom of container C, is to prevent persons from fishing through the opening $c$ into the bottom of the stack and extracting merchandise therefrom. Vertical walls $a^7$, $a^7$ rising above the margin of the bottom $a^6$ form the delivery chute for the solids.

For the vending of the liquids, I provide the upstanding offset lever 44, the foot of which is pivoted at 45 to a side wall of the casing near the bottom thereof. Above this pivotal connection, lever 44 is loosely jointed at 46 to the free end of a piston-like plunger 47 (Fig. 9) which has a transverse measuring hole 48 bored vertically through it, this hole or passage forming part of a measuring receptacle. The plunger 47 works in a stationary cylinder 49 having an upper intake port connected with the foot of the liquid supply conduit $b$ near the rearward end of the cylinder. The cylinder is made sufficiently long to permit the measuring hole 48 of the plunger to have its bottom closed by an under wall of the cylinder when the plunger is at the rearmost position of its stroke, the supply conduit $b$ then communicating with the top of the measuring-hole. The under forward portion of the cylinder communicates through a port with a discharge or supply conduit $b^2$ leading to the spigot $b'$. In its forward delivering position the upper port of the cylinder is closed by the plunger wall rearwardly of the measuring hole. When the plunger, having its measuring hole filled, is moved forward sufficiently to bring the bottom of the measuring hole into communication with the discharge conduit $b^2$, the purchaser may receive his drink from the spigot $b'$.

A reciprocating motion at the proper times is given to the plunger by means of the lever 44 which is pushed forwardly by either or both the angular extensions 32 and 33 above mentioned, as the token-engaged push-bars, whereof they are parts, are pushed forward, the transverse extremities of such extensions reciprocating in the path of the lever 44 and pushing it forwardly when either or both push-bars 16 and 27 are moved forward by the deposited token connection or connections between the actuator head and such push-bars.

Pull-bar 2 is provided with upstanding offset resetting arm 50 having a transversely bent front end 51 in the path of the front edge of lever 44. This arm 50 is fixed to the pull-bar, and when the pull-bar is pulled forward it is moved against the resistance of a coil spring 52, the front end of which is fixed at 53 to the lateral extension $2^a$ of the pull-bar, and the rear end of which is fixed at 54 to the rear wall of the casing. Consequently when the pull-bar is drawn rearwardly by the spring 52, the lever 44 is moved rearwardly by engagement with the end 51 of arm 50, so that the plunger is moved rearwardly to bring its measuring hole into liquid-receiving position.

In regard to the lever 44 it is to be noted that it is a work-performing lever and that a broad feature of my invention, independently of the particular type of machine here particularly described, involves the lever 44 as a resetting element which is one of its functions, and as a member adapted for the transmission of motion imparted to it by one or more of the push-bars. And as will hereinafter be sufficiently indicated by the claims, I intend to claim some features of my invention generically because they may be embodied in other forms of token-actuated machines some of which form the subject-matter of my co-pending application Serial No. 117,403 filed August 29, 1916.

The machine as above described is, in payment of deliveries, constructed for reception of dimes and nickels,—and not of pennies. Such United States coins are of different diameters, the dime being smallest and thinnest, the pennies next larger and thicker, and the nickels the largest and thickest. Pennies may be put into the machine as a matter of fact. If so, they are returned by the machine to the depositor. In order that dimes and nickels may be retained and pennies returned, the token-chute 35 is constructed as follows: The nickel-receiving slot D communicates with the chute passage 55, the rear end of which communicates with a space 56 which is in communication through another chute passage 57 with a dime-receiving slot D', and also with the downwardly-extending rear end 58 of the chute over the coin-way 36.

A deposited dime or nickel will obviously run to the coin-way, but pennies or one-cent pieces may be put through the nickel-receiving slot D, and if so they will run rearwardly as far as the lengthwise-extending slot 59 in the bottom of the passage 55 and drop therethrough into the downwardly and forwardly extending passage 60 of the dependent branch of the chute, and come out through the penny-discharge slot $c^2$ in the front wall of the casing. As nickels are thicker than pennies and are thicker than the width of slot 59, the deposited nickels will run along the bottom of passage 55 over slot 59 and to the token-way 36.

Suppose that a customer deposits a dime in the chute. It will fall downwardly from the chute into the token-way 36 and lodge against the abutment 30 of the lowermost push-bar 27 and be held edgewise between the lug 5 and the rear end of push-bar 27, and sidewise between the plate 37 and the opposed wall of the head $2^b$. A forward pull of the pull-bar will move all the token-engaging lugs 3, 4 and 5 forwardly through the notches in the web 38, and the lug 5 pushing against the rear edge of the dime, the front edge of which rests against the rear end of the push-bar 27, will cause a forward movement of the latter. As shown in Fig. 11, at the completion of such forward movement, the upstanding arm 31 will have moved the feeder forwardly and pushed out the lowermost solid S from the stack, and at the same time the angular extension 32 will have engaged the work-lever 44 and pushed the measuring plunger 47 forward to deliver a measure of liquid to the conduit $b^2$. Thus for a dime the purchaser will get a drink and also a sandwich.

Supposing however that the purchaser does not want a drink, but wants a sandwich, the price of which is five cents. Then a nickel coming into the token-space 36 will be arrested by the abutment 20 of the intermediate push-bar which is the feeder-carrying bar 19, and a forward pull of the pull-bar will now cause a forward movement of the push-bar 19 alone, the upper and under push-bars then remaining stationary and the coin-engaging lug 4 of the head $2^b$ pushing the nickel against the rear end of the intermediate push-bar 19 carrying the feeder and causing the latter to eject the lowermost sandwich in the stack.

But if two nickels are deposited, one will be directly on top of the other and the push-bar 16 will be moved forward simultaneously with the movement of the push-bar 19 carrying the feeder, and the lugs 3 and 4 pushing against the rear edges of the two nickels will effect a forward simultaneous movement of the push-bars 16 and 19; and in that case the angular extension 33 will engage the upper end of the lever 44 and cause a drink delivering movement of the measuring plunger and also push out a sandwich.

In this form of machine the purchaser cannot buy a drink without buying a solid, but he may buy either a solid and a drink, or a solid without a drink.

The dimensions of the parts above described may be varied to suit coins of different denominations, or rather of different diameters and thicknesses corresponding to different denominations; and various changes may be made in construction without departure from the invention; and instead of coins, various kinds and forms of tokens for various purposes may be used, the coin or token deposited constituting a well-known mechanical factor or element in the operation of the machine when it performs the particular kind of work it is intended to perform. Not only is it possible to use any one or all of the push-bars for transmitting motion and thereby performing work either analogous to or wholly different from the kind of work herein specifically proposed, but it is also possible so to employ the work-lever 44, and I propose to employ certain features of this invention in machines of various kinds for doing other kinds of work than herein described. Either the liquid-measuring mechanism or the solid vending mechanism may be omitted if desired, and the form of each such mechanism may be varied without departure from this invention. By use of the actuator mechanism and one or more push-bars either with or without the feeder attachment, one may construct a variety of useful token-actuated machines.

What I claim is:

1. The combination with an actuator mechanism comprising a manually-accessible handle, a resetting arm, a head having a plurality of laterally projecting token-engaging lugs, and a spring against the resistance of which the handle is manually moved; of a plurality of endwise-movable token-engaging push-bars an end of each of which is opposed to a token-engaging lug, such end having an open lengthwise-extending lug-receiving recess; means for supporting the push-bars severally, such means comprising a lengthwise slot in the push-bar and a pin therethrough and carried by said head, such pin and slot connection serving to move the push-bar rearwardly during completion of a rearward movement of the head; a token-way structure open at its upper end for admission of tokens and having opposed vertical spaces for reciprocation through such spaces of the token-engaging lugs and of the push-bars, all the foregoing being constructed and operating to secure an endwise movement of one or more push-bars on the interposition of a token or tokens between said lugs and push-bars in said token-way and to permit a token-carrying movement of said lugs and push-bars for carrying the engaged tokens out of said token-way, the spring exerting its pull first to move the lug and pin carrying head away from the opposed ends of the push-bars in order to release the engaged token or tokens when they have been carried out of the token-way and on release of the handle, and thereafter by coöperation of said pins and slots to reset the push-bars in their initial working positions; a solid-merchandise-feeder carried by a token-engaging push-bar; a solid-merchandise-container having from its lower portion a chute connection with an opening in the casing of the machine and comprising a bottom above which in the walls of the container are opposed spaces one for entrance of the feeder and the other for ejection of solid merchandise from said container; a liquid-measuring mechanism having an accessible delivery device; a work-lever in the path of certain of said push-bars and located to be acted on during a manual movement of said handle, such work-lever being also in the path of the resetting arm and located to be acted on by the pull of the spring on the release of the handle; and, carried by one of said push-bars, a feeder-actuating arm.

2. The combination with an actuator mechanism comprising a manually-accessible handle, a resetting arm, a head having a plurality of laterally projecting token-engaging lugs, and a spring against the resistance of which the handle is manually moved; of a plurality of endwise-movable token-engaging push-bars an end of each of which is opposed to a token-engaging lug, such end having an open lengthwise-extending lug-receiving recess; means for supporting the push-bars severally, such means comprising a lengthwise slot in the push-bar and a pin therethrough and carried by said head, such pin and slot connection serving to move the push-bar rearwardly during completion of a rearward movement of the head; a token-way structure open at its upper end for admission of tokens and having opposed vertical spaces for reciprocation through such spaces of the token-engaging lugs and of the push-bars, all the foregoing being constructed and operating to secure an endwise movement of one or more push-bars on the interposition of a token or tokens between said lugs and push-bars in said token-way and to permit a token-carrying movement of said lugs and push-bars for carrying the engaged tokens out of said token-way, the spring exerting its pull first to move the lug and pin carrying head away from the opposed ends of the push-bars in order to release the engaged token or tokens when they have been carried out of the token-way and on release of the handle, and thereafter by coöperation of said pins and slots to reset the push-bars in their initial working positions; a solid-merchandise-feeder carried by a token-engaging push-bar; a solid-merchandise-container having from its lower portion a chute connection with an opening in the casing of the machine and comprising a bottom above which in the walls of the container are opposed spaces one for entrance of the feeder and the other for ejection of solid merchandise from said container; a liquid-measuring mechanism having an accessible delivery device; a work-lever in the path of certain of said push-bars and located to be acted on during a manual movement of said handle, such work-lever being also in the path of the resetting arm and located to be acted on by the pull of the spring on the release of the handle; and, carried by one of said push-bars, a feeder-actuating arm; the push-bars being three in number and mounted one above the other, the intermediate push-bar carrying the feeder and the bottom push-bar carrying the feeder-actuating arm, the intermediate push-bar being sufficiently shorter than the other push-bars not to contact with the work-lever, and the top and bottom push-bars being constructed to contact with the work-lever, all constructed and operating to deliver either a solid and also a measure of liquid, or a solid without a measure of liquid.

3. The combination with an actuator mechanism comprising a manually-accessible handle, a resetting arm, a head having a plurality of laterally projecting token-engaging lugs, and a spring against the resistance of which the handle is manually moved; of a plurality of endwise-movable token-engaging push-bars an end of each of which is opposed to a token-engaging lug, such end having an open lengthwise-extending lug-receiving recess; means for supporting the push-bars severally, such means comprising a lengthwise slot in the push-bar and a pin therethrough and carried by said head, such pin and slot connection serving to move the push-bar rearwardly during completion of a rearward movement of the head; a token-way structure open at its upper end for admission of tokens and having opposed vertical spaces for reciprocation through such spaces of the token-engaging lugs and of the push-bars, all the foregoing being constructed and operating to secure an endwise movement of one or more push-bars on the interposition of a token or tokens between said lugs and push-bars in said token-way and to permit a token-carrying movement of said lugs and push-bars for carrying the engaged tokens out of said token-way, the spring exerting its pull first to move the lug and pin carrying head away from the opposed ends of the push-bars in order to release the engaged token or tokens when they have been carried out of the token-way and on release of the handle, and thereafter by coöperation of said pins and slots to reset the push-bars in their initial working positions; a solid-merchandise-feeder carried by a token-engaging push-bar; a solid merchandise-container having from its lower portion a chute connection with an opening in the casing of the machine and comprising a bottom above which in the walls of the container are opposed spaces one for entrance of the feeder and the other for ejection of solid merchandise from said container; a liquid-measuring mechanism having an accessible delivery device; a work-lever in the path of certain of said push-bars and located to be acted on during a manual movement of said handle, such work-lever being also in the path of the resetting arm and located to be acted on by the pull of the spring on the release of the handle; and, carried by one of said push-bars, a feeder-actuating arm; the measuring device comprising a cylinder having an upper intake port and an under delivery port, one port being near one end and the other near the other end of the cylinder; and a reciprocable plunger working in the cylinder and having transversely through it a measure-forming hole, said plunger being connected to the work-lever.

4. The combination with an actuator mechanism comprising a manually-accessible handle, a resetting arm, a head having a plurality of laterally projecting token-engaging lugs, and a spring against the resistance of which the handle is manually moved; of a plurality of endwise-movable token-engaging push-bars an end of each of which is opposed to a token-engaging lug, such end having an open lengthwise-extending lug-receiving recess; means for supporting the push-bars severally, such means comprising a lengthwise slot in the push-bar and a pin therethrough and carried by said head, such pin and slot connection serving to move the push-bar rearwardly during completion of a rearward movement of the head; a token-way structure open at its upper end for admission of tokens and having opposed vertical spaces for reciprocation through such spaces of the token-engaging lugs and of the push-bars, all the foregoing being constructed and operating to secure an endwise movement of one or more push-bars on the interposition of a token or tokens between said lugs and push-bars in said token-way and to permit a token-carrying movement of said lugs and push-bars for carrying the engaged tokens out of said token-way, the spring exerting its pull first to move the lug and pin carrying head away from the opposed ends of the push-bars in order to release the engaged token or tokens when they have been carried out of the token-way and on release of the handle, and thereafter by coöperation of said pins and slots to reset the push-bars in their initial working positions; a solid-merchandise-feeder carried by a token-engaging push-bar; a solid-merchandise-container having from its lower portion a chute connection with an opening in the casing of the machine and comprising a bottom above which in the walls of the container are opposed spaces one for entrance of the feeder and the other for ejection of solid merchandise from said container; a liquid-measuring mechanism having an accessible delivery device; a work-lever in the path of certain of said push-bars and located to be acted on during a manual movement of said handle, such work-lever being also in the path of the resetting arm and located to be acted on by the pull of the spring on the release of the handle; and, carried by one of said push-bars, a feeder-actuating arm; and a three-way token-receiving chute, two branches of which discharge into the token-way structure, and the other branch of which connects a bottom slot in one branch of the chute with an accessible opening in a wall of the casing.

5. The combination of a work-lever with a plurality of endwise-movable token-engaging push-bars arranged one above the other and constructed and located to be brought into engagement with the work lever; an intermediate endwise-movable token-engaging push-bar so constructed and located as not to be brought into engagement with the work lever; each push-bar having a lengthwise extending pin-receiving closed slot and an open lengthwise-extending lug-receiving slot; a projecting feeder carried by such intermediate push-bar; the bottom push-bar having an upstanding finger to engage the feeder; a merchandise container for said feeder; a merchandise-delivering apparatus connected with the work-lever; and an actuator mechanism comprising a manually operable handle, a resetting arm in the path of the work-lever, a pin and token-engaging lug carrying head, and a spring; said pin working in said closed slot and said lug being enterable in said open slot; and a token-way structure open at its top for reception of tokens, and also open at its edges for reciprocation therethrough of token-engaging ends of the push-bars and of the lugs.

6. The combination of an endwise movable push-bar; at one of its ends a token-way structure; a reciprocating head operatively connected with said push-bar and having a token-engaging lug opposed to said end of the push-bar; the token-way structure being constructed to permit reciprocation through it of the lug and of said end of the push-bar when such end and the lug are in engagement with an intervening token; for said head an actuator mechanism comprising a handle for manual operation of said head in the token-engaging movement; a spring for mechanically actuating the push-bar and head simultaneously on release of the handle in a reverse direction; a work-lever in the path of the other end of the push-bar; and comprised in the actuator mechanism a resetting arm located to engage the work-lever in reversing the movement of the head on release of the handle; the push-bar having a lengthwise-extending lug-receiving slot.

7. The combination of an actuator mechanism comprising a reciprocating head having a lug to engage a deposited token and also comprising a handle, a resetting arm and a spring; a push-bar constructed to coöperate with said lug in temporary engagement with an intervening token, the head and push-bar being operatively connected and constructed and operating to carry the engaged token from its position of initial engagement to a position of release; a work-lever in the path of the push-bar and engaged thereby on the manual actuation of said handle, whereby also the head and push-bar are moved to engage and carry the deposited token to its position of release, said work-lever being moved with the push-lever on manual actuation of the handle and during the token-carrying movement, and being engaged by the resetting arm under pull of the spring on release of the handle.

8. The combination with an actuator mechanism comprising a handle, a spring, and a token-engaging head having a token-engaging lug, of a token-engaging push-bar having a lengthwise slot and a token supporting abutment at its token-engaging end; a pin carried by said head and projecting into and working in said slot and thereby partially supporting the push-bar, and other means for supporting such push-bar slidably, the head and push-bar coöperating by intervention of a deposited token, during actuation of the handle against the resistance of the spring, and being constructed and operating to release the token on release of the handle, the pull of the spring on release of the handle effecting a reverse movement of the head into its initial position, and the pin carried by the head engaging an end of the slot in the push-bar and also restoring the push-bar to its initial position, the push-bar having a lengthwise extending open slot for admission of said lug.

9. The combination with an actuator mechanism comprising a handle, a resetting arm, a spring, and a token-engaging head, of a token-engaging push-bar having a lengthwise slot, a pin carried by said head and projecting into and working in said slot and thereby partially supporting the push-bar, and other means for supporting such push-bar slidably, the head and push-bar coöperating by intervention of a deposited token, during actuation of the handle against the resistance of the spring, and being constructed and operating to release the token on release of the handle, the pull of the spring on release of the handle effecting a reverse movement of the head into its initial position, and the pin carried by the head then engaging an end of the slot in the push-bar and also restoring the push-bar to its initial position; a work-lever in the path of the resetting arm; the resetting arm being moved away from the work-lever on the manual actuation of the handle, and the pull of the spring on release of the handle bringing the resetting lever into engagement with the work-lever and restoring it to its initial position.

10. The combination with an actuator mechanism comprising a handle, a resetting arm, a spring, a token-engaging lug and a pin; of an endwise reciprocable token-engaging push-bar; a token-way structure in which a deposited token is arrested and engaged by the lug and push-bar, such structure comprising side walls spaced apart; the push-bar having a lengthwise-extending pin-receiving closed slot and a lengthwise-extending open slot for reception of the lug.

11. The combination with an actuator mechanism comprising a handle, a resetting arm, a spring, a plurality of token-engaging lugs and a plurality of pins; of a plurality of endwise-movable token-engaging push-bars located one above another and each having a closed lengthwise-extending pin-receiving slot for one of said pins, and an open lengthwise-extending slot for one of said lugs; and the under push-bars each having side bevels to facilitate escape of engaged tokens on their release; upstanding plates forming sides of a token-receiving space and spaced apart for reciprocation therethrough of the lugs and of the opposed ends of the push-bars; and a work-lever intermediate the other ends of the push-bars and the resetting arm for engagement of tokens therein; each push-bar and its coöperating lug being constructed and operating to carry an engaged token out of the token-way structure and then to release it, and each under push-bar being formed with a side bevel to facilitate the escape of a released token.

12. The combination of token-engaging and carrying mechanism; merchandise-delivering mechanism; and actuator mechanism; of a many-branched token-receiving chute constructed to deliver tokens to the token engaging and carrying mechanism and also constructed with a token-escape slot in the bottom of one of its branches, and with a token-escape passage therefrom to an accessible opening; the bottom walls of the slotted branch at each side of the slot forming runs for tokens too large to fall through the slot.

In testimony whereof I have hereunto set my hand this 23rd day of August, 1916.

GONZALO ANCIRA GARCIA.